United States Patent [19]

Goetz

[11] 3,919,821

[45] Nov. 18, 1975

[54] MULTIPANE GLAZING UNIT
[75] Inventor: Guenther Goetz, Rodheim, Germany
[73] Assignee: Bostik G.m.b.H., Oberursel, Germany
[22] Filed: July 25, 1973
[21] Appl. No.: 382,569

[30] Foreign Application Priority Data
July 27, 1972 Germany............................ 2237018

[52] U.S. Cl. ....................... 52/398; 52/616; 52/656
[51] Int. Cl.² .......................................... E06B 3/24
[58] Field of Search ............ 52/172, 308, 398, 399, 52/616, 658, 656

[56] References Cited
UNITED STATES PATENTS

| | | | |
|---|---|---|---|
| 1,913,205 | 6/1933 | Lenhart | 52/172 |
| 2,393,419 | 1/1946 | Schaaf | 52/658 |
| 3,001,249 | 9/1961 | Elton | 52/172 |
| 3,226,903 | 1/1966 | Lillethun | 52/172 |
| 3,305,998 | 2/1967 | Deisenroth | 52/656 |
| 3,345,791 | 10/1967 | Shinefeld | 52/161 |
| 3,376,670 | 4/1968 | Jones | 52/656 |
| 3,852,149 | 12/1974 | Sitter | 52/172 |

FOREIGN PATENTS OR APPLICATIONS

| | | | |
|---|---|---|---|
| 504,948 | 8/1954 | Canada | 52/172 |
| 634,783 | 1/1962 | Canada | 52/172 |
| 69,198 | 6/1914 | Austria | 52/656 |
| 915,792 | 1/1963 | United Kingdom | 52/616 |

*Primary Examiner*—Ernest R. Purser
*Assistant Examiner*—Henry Raduazo
*Attorney, Agent, or Firm*—Benjamin C. Pollard; Vincent A. White; Richard B. Megley

[57] ABSTRACT

Method of making spacer members and multipane insulating glazing unit in which an assembly of spaced parallel panes of glass are separated by spacer members extending parallel to the edges leaving a channel between outer faces of the spacers and marginal portions of the panes to define a central enclosed space with bonding and sealing material in the channels, the spacer members being hollow to contain a drying agent with openings to the enclosed space and with their ends at least partially closed as by deformation inward of end portions of their outer walls to accommodate a greater depth of sealing material between the hollow interiors of the spacers and outside air.

3 Claims, 3 Drawing Figures

U.S. Patent  Nov. 18, 1975  3,919,821
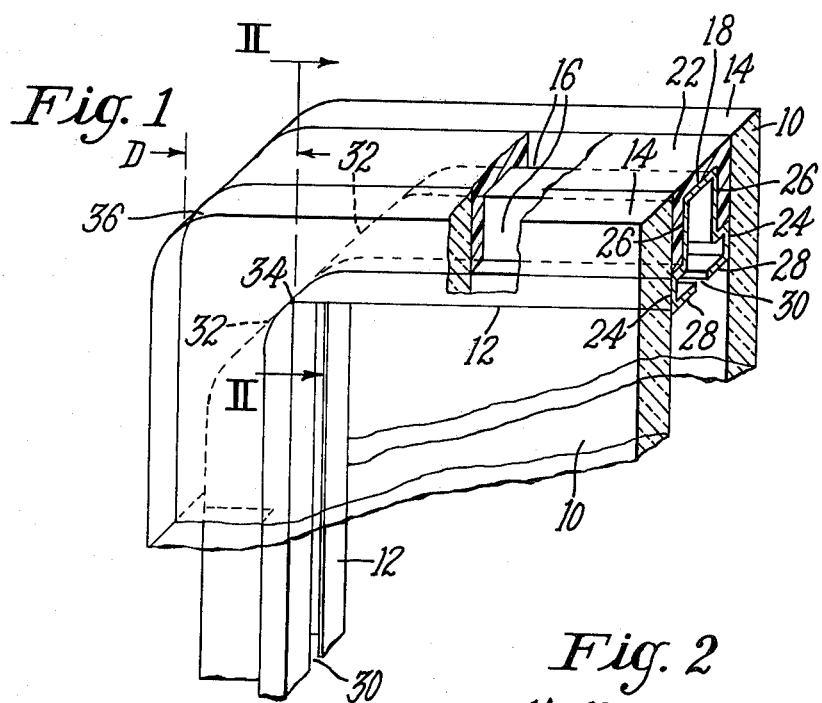
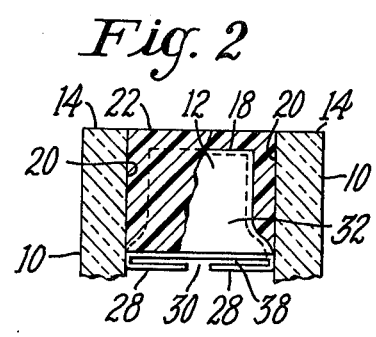
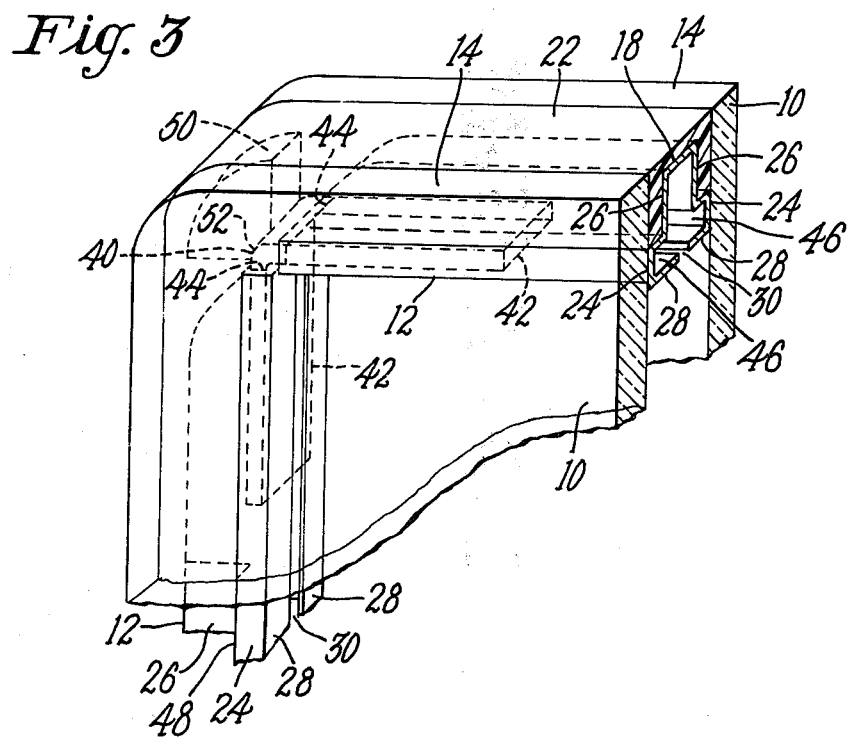

MULTIPANE GLAZING UNIT

BRIEF STATEMENT OF THE INVENTION

This invention relates to a method for making spacer members and to improved multipane insulating glazing unit including such spacers.

BACKGROUND OF THE INVENTION

Field of the Invention

Multipane units in which hollow spacers are disposed between the panes near the edges to form a peripheral channel and in which a bonding and sealing agent fills the peripheral channel are known. A problem existing in such units is that the ends of the spacer members at the corners of the units are open so that any failure in the body of sealing material adjacent an open end will allow access of outside air to the hollow interiors of the spacer members and from there into the central space enclosed by the panes and spacer members. In order to prevent such entry of the outer air, it has been proposed to seal the end openings by welding or soldering and to join together abutting ends of two spacer members at the corners. Such welded or soldered joints are, however, expensive, while on the other hand, they are not particularly reliable with respect to air tightness which is of particularly high importance in multiple pane insulating glazing. In addition, there is the difficulty that the spacer members are usually made of aluminum present serious difficulty in welding or soldering.

SUMMARY OF THE INVENTION

It is an object of the present invention to provide multipane insulating glazing units including novel spacer member construction to give improved resistance to passage of external air into the enclosed central space of the unit and to provide a simple and inexpensive method of making such spacer members.

In accordance with the present invention, resistance to penetration of outside air into the central enclosed space of a multipane glazing unit is improved by partial closure of the ends of the spacer members as by bending inward of the outer walls of end portions of the spacer members so that any openings at the ends of the spacer members are located inwardly of the outer walls of the spacer members and a deep body of sealant is interposed between the outer air and openings at the ends of the spacer members.

The invention will be described in connection with the accompanying drawings forming part of the present invention in which:

FIG. 1 is an angular elevational view with parts broken away of a corner portion of a multipane insulating glazing unit according to the present invention; p FIG. 2 is a sectional view with parts broken away taken along the line II—II of FIG. 1 of the multipane glazing unit of FIG. 1; and FIG. 3 is an angular elevational view of a corner portion of another form of multipane glazing unit according to the present invention.

The multipane glazing unit shown in FIG. 1 includes panes 10 of glass and spacer members 12 extending parallel to and set in from the edges 14 of the panes 10 to form channels 16 (see FIG. 1), defined by the outer walls 18 of the spacer members 12 and the marginal surfaces 20 of the panes 10 of glass outwardly of the spacer members 12. Sealing and bonding material 22 is disposed in the channels 16 to hold the assembly of glass panes 10 and spacer members 12 together as a unit and to bar the entry of outer air with its dust and/or moisture to the space enclosed between the panes and spacer members.

The spacer members 12 shown in FIGS. 1 and 2 are hollow channels of uniform cross section providing walls 24 which determine the spacing of the panes 10 and insert walls 26 forming with the inner surfaces of the panes 10 thin cross section troughs providing greater surface area for bonding of the assembly by the bonding and sealing agent 22. The inwardly facing walls 28 of the spacer members 12 provide openings shown as slots 30 providing communication between the central enclosed space of the assembly and the interior of the spacer members. Desiccant material (not shown) may be placed in the hollow space within the spacer members 12 for taking up any moisture present in the air within the central space at the time the assembly is completed. The outer walls 18 of the spacer members 12 will ordinarily be a limited distance within the plane established edges 14 of the panes 10 so that when sealing material 22 is applied, there will be a continuous body of bonding and sealing material extending from the trough on one side of the spacer members 12 across and covering the outside wall 18 of the spacer members and extending down into the trough on the other side of the spacer members 12.

As shown in FIGS. 1 and 2, the end portions 32 of outer walls 18 are bent or crimped in at an angle in such a way that the surfaces of the bent portion run obliquely toward the apex 34 of the angle of which adjacent spacer members 12 are the sides and constitute integral closures for the ends of the spacer members at the corners 36 of the multipane glazing unit assembly. At the corner 36 of the multipane glazing unit there is thus a generally triangular zone which is completely filled with sealing material. Although there remains a small opening 38 between the bent in outer wall end portions 32 and the inner wall 28 and also an opening resulting from the slot 30 through the inner wall 28, it will be seen that the opening is spaced a distance from the free surface of the sealing material 22, (indicated as D in FIG. 1), approximately equal to the height of the spacers 12 plus the thickness of the sealing material 22 outside the outer wall 18 between the opening and outside air which serve effectively to prevent entry of outside air into the hollow interior of the spacer members and to central enclosed space of the glazing unit so that even at the corner of the multipane glazing unit a reliable seal is guaranteed.

If on the contrary one should cut off the spacer members 12 in a straight fashion at their ends, or make them abut along a mitre, then directly at the point of cut of the spacer members against any other spacer member, its cavity would only be separated from the outside air sealing material that is as thin as the distance from outer walls 18 of spacer members 12 to the outer surface of the sealing material lying above the outer walling. This distance, however, is only very short, since normally the spacer members are inset right at the outer edge of the glass panes, so that hardly any space remains for sealing material that lies on the outer walls 18. Outside air could penetrate relatively easily through this short stretch.

For ease in assembly and other advantages, the spacer members 12 may be connected to each other at corners by corner pieces 40, the arms of which project into the open ends of the spacer members. Using such a corner piece 40 as shown in FIG. 3, it will be seen that the outer walls 18 of the spacers are bent inwardly at an angle as in the first form of the invention but that this inward bending is only to an extent leaving opening 44 of size suitable for entry of the arms 42 of the corner piece. In the form shown, the bending is down to the level of the edges of the walls 24 so that edge channels 46 formed by the walls 28, the walls 24 and the shoulders 48 at the outer edges of the walls 24 are of a size to receive the arms 42 of the corner piece 40. Although the distance between the residual end opening 44 of the spacer members 12 to the free surface of the sealing material 22 is not quite so great in this form of the invention as in the first described form, the depth of bonding and sealing material between the outside air and the edge of the residual opening is still many times greater than the depth of bonding and sealing material over the outer walls in the main portions of the spacer members.

A filler piece 50 may be a part of the corner piece 40. In the form shown, this is a quadrant joined to the apex 52 of the corner piece. This filler piece 50 is of advantage in uniform filling of the corner with bonding and sealing material since it provides a surface resisting pressure applied on one side of the angle from forcing bonding and sealing material out of the other face of the angle.

Having thus described my invention what I claim as new and desire to secure as Letters Patent of the United States is:

1. In a multipane insulating glazing unit comprising an assembly of spaced parallel panes of glass having edges and corners, a plurality of integral spacer members of substantially uniform width between said panes defining an enclosed central space between said panes, said spacer members having hollow interiors defined by walls of substantially impervious material comprising inner walls with openings for communication between said central space and the interiors of said spacer members, outer walls and side walls including surface portions for determining the spacing of said panes, said spacer members extending generally parallel to and with their outer walls spaced inwardly of the edges of said panes to form channels along the periphery of said assembly and said spacer members terminating in ends adjacent ends of other spacer members at corners of said glazing unit, and bonding and sealing material in said channels extending from pane to pane exteriorly of said outer walls of said spacers bonding together said panes and spacer members and sealing said assembly against passage of air to or from said central space, the improvement which comprises that said outer walls and portions of said side walls are bent toward said inner walls at the ends of said spacer members to constitute integral impervious closure means for the ends of said spacer members to restrict any openings at said ends to locations inwardly of said outer walls, that corner pieces comprising angularly extending arms are disposed with said arms in said restricted openings at ends of said spacer members to connect said spacer members at corners of said glazing unit and at each of said corners a body of sealant between the outermost edge of said openings and the outer air having a thickness a plurality of times the thickness of sealant between said outer walls and the outer air in the major portions of the length of said spacers.

2. A multipane glazing unit as defined in claim 1 in which a filler piece is carried by said corner piece and extends into said triangular zone.

3. A multipane glazing unit as defined in claim 1 in which said side wall surface portions for spacing of panes extend from said inner walls a distance about equal to the thickness of said arms of said corner pieces, further portions of said side walls are inset and a shoulder connects said surface for spacing of panes with said inset portions and forms edge channels for receiving the arms of said corner pieces, and in which said outer walls are bent toward said inner walls to a level corresponding to said shoulders.

* * * * *